(12) United States Patent  
Mutzabaugh (10) Patent No.: US 9,252,842 B2  
(45) Date of Patent: Feb. 2, 2016

(54) POWER OVER COAXIAL CABLE

(75) Inventor: Dennis M. Mutzabaugh, Mount Prospect, IL (US)

(73) Assignee: Intersil Americas LLC, Milpitas, CA (US)

( * ) Notice: Subject to any disclaimer, the term of this patent is extended or adjusted under 35 U.S.C. 154(b) by 874 days.

(21) Appl. No.: 13/535,046

(22) Filed: Jun. 27, 2012

(65) Prior Publication Data

US 2013/0187445 A1 Jul. 25, 2013

Related U.S. Application Data

(60) Provisional application No. 61/589,164, filed on Jan. 20, 2012.

(51) Int. Cl.
*H02J 1/00* (2006.01)
*H04B 3/54* (2006.01)

(52) U.S. Cl.
CPC *H04B 3/548* (2013.01); *H04B 3/54* (2013.01); *H04B 2203/547* (2013.01); *H04B 2203/5487* (2013.01)

(58) Field of Classification Search
CPC .... H04B 3/54; H04B 3/548; H04B 2203/547; H04B 2203/5487
USPC ...................................................... 307/1, 3, 4
See application file for complete search history.

(56) References Cited

U.S. PATENT DOCUMENTS

| 8,766,746 B2 * | 7/2014 | Nedovic ......................... 333/213 |
| 2005/0024025 A1 * | 2/2005 | Sevenhans et al. ........... 323/249 |
| 2010/0194899 A1 | 8/2010 | Lam |
| 2010/0321580 A1 | 12/2010 | Mutzabaugh et al. |
| 2010/0322296 A1 | 12/2010 | Lam et al. |
| 2010/0322297 A1 | 12/2010 | Fimoff et al. |
| 2010/0322347 A1 | 12/2010 | Fimoff et al. |
| 2010/0322348 A1 | 12/2010 | Tomezak et al. |
| 2012/0086813 A1 | 4/2012 | Fimoff et al. |

FOREIGN PATENT DOCUMENTS

| TW | 201116058 | 5/2011 |
| WO | 2010088625 | 8/2010 |

* cited by examiner

*Primary Examiner* — Hal Kaplan
(74) *Attorney, Agent, or Firm* — Paul A. Bernkopf; Bryan A. Santarelli; Lane Powell PC (57) ABSTRACT

An image communication system includes a coaxial cable having first and second ends. A monitor station is coupled to the first end and a camera is coupled to the second end. The monitor station provides power to the camera through the cable, while the cable is also used to carry communication signals transmitted by the camera to the monitor station. The image communication system includes a first active inductor coupled to the first end and a second active inductor coupled to the second end. A current-compensation circuit may also be provided.

23 Claims, 8 Drawing Sheets

POWER OVER COAXIAL CABLE

PRIORITY CLAIM

The present application claims the benefit of and priority under 35 U.S.C. §119(e) to U.S. Provisional Patent Application No. 61/589,164, entitled "POWER OVER COAXIAL CABLE," filed Jan. 20, 2012, which is incorporated herein by reference in its entirety.

TECHNICAL FIELD

The present disclosure generally relates to video communication systems and other types of image communication systems, and particularly, but not exclusively, relates to providing power for image communication systems having a cable, such as a coaxial cable, that couples a camera to a monitor.

BACKGROUND

A video or other image communication system typically includes at least one monitor station and at least one camera that is located remotely from the monitor station. A communication link, such as a coaxial cable, may be used to couple the monitor station to the camera.

It can be difficult to effectively and efficiently provide power to the camera in such image communication systems.

BRIEF DESCRIPTION OF THE DRAWINGS

One or more non-limiting and non-exhaustive embodiments are described with reference to the following figures, wherein like reference numerals refer to like parts throughout the various views unless otherwise specified or unless the context indicates otherwise.

DETAILED DESCRIPTION

One or more embodiments of techniques to provide power over a coaxial cable are described herein. In the following description, numerous specific details are given to provide a thorough understanding of one or more embodiments. The one or more embodiments can be practiced without one or more of the specific details, or with other methods, components, materials, etc. In other instances, well-known structures, materials, or operations are not shown or described in detail to avoid obscuring aspects of the one or more embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present disclosure relates generally to a power over coaxial cable (POC) technique in which power, such as direct current (DC) power, is provided over the coaxial cable to a remotely located camera. The power is provided to the camera because a local power source for the camera may be unavailable or insufficient. The POC technique of one embodiment uses active inductors to enable adequate power to be provided on the coaxial cable, while also providing a sufficiently large impedance such that the video signal generated by the camera can be transmitted on the coaxial cable without or with substantially reduced degradation.

According to one embodiment, a current-compensation circuit is provided to enable minimization of voltage spikes in the video signal. Furthermore in some embodiments, circuitry can be provided to guard against voltage/current spikes due to connection and disconnection, no load conditions, over current conditions, etc.

Figure 1:
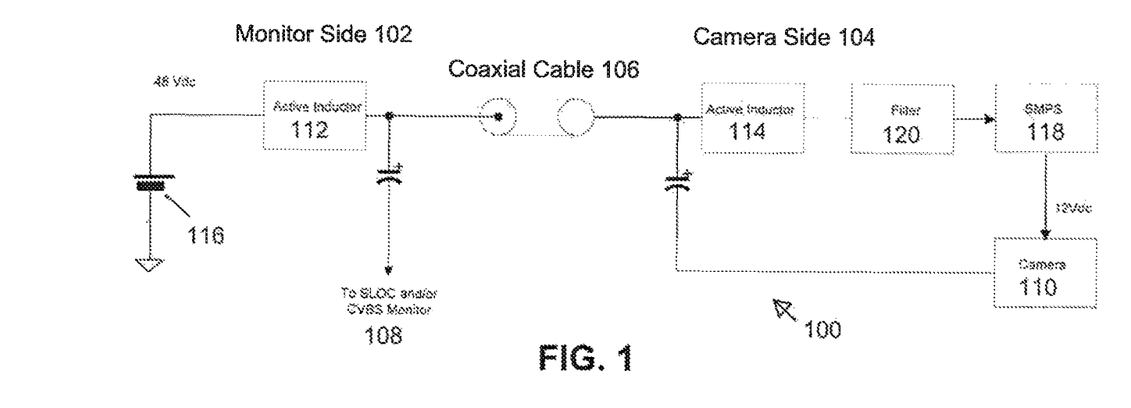
FIG. 1 is a block diagram of an image communication system according to one embodiment.

Referring first to FIG. 1, shown generally at 100 is an image communication system according to one embodiment. The image communication system 100 may include, for example, a closed-circuit video broadcast system (CVBS) (e.g., a close-circuit television or video system) or other type of image communication system having a monitor side 102 and a camera side 104. A coaxial cable 106 or other communication link may be used to communicatively and electrically couple the monitor side 102 to the camera side 104.

The monitor side 102 includes at least one monitor station 108, and the camera side 104 includes at least one camera 110 that is located remotely from the monitor station 108 and that is coupled to the monitor station 108 via the coaxial cable 106. The monitor station 108 can include any type of electronic device having a display screen that is capable to present images, video (with or without audio), graphics, and so forth. In some embodiments, the monitor station 108 may include a digital video recorder (DVR) or other recording device. The camera 110 can include any type of electronic device that is capable to capture or generate images, video (with or without audio), graphics, and so forth.

In some situations, there may be no power or insufficient available at the location of the camera 110, and so power may be provided to the camera 110 from the monitor side 102. One way to provide power would be to run a separate power line from the monitor station 108 to the camera 110. However, the need for a separate wire for the power line can be avoided if a power signal is provided over the coaxial cable 106, together with video signals, control signals, and any other signal(s).

A potential problem with this technique is that a power supply typically has a low output resistance, but coupling a power supply having a low output resistance to the coaxial cable 106 may cause the termination impedance that the coaxial cable 106 "sees" to be less than the optimum termination impedance (e.g., for maximum power transfer and for minimum signal attenuation). For example, if the coaxial cable 106 has a characteristic impedance $Z_0$=75 ohms, then the maximum power transfer (and thus the minimum signal loss) theoretically occurs if the termination impedance is also 75 ohms. That is, while the termination impedance should typically approximately equal the characteristic impedance $Z_0$ of the coaxial cable 106 for optimal performance, the output impedance of a power supply may be significantly lower than the characteristic impedance $Z_0$, thereby resulting in non-optimal power transfer.

Such image communication system 100 may also use a number of different video signal protocols, and each of these protocols may include signals having various bandwidths. For example, an analog protocol may use an analog video signal, such as a National Television System Committee (NTSC) video signal, between the camera 110 and the monitor station 108. The bandwidth of such an analog signal may range approximately from 30 Hz to 5 MHz. In contrast, the bandwidth of a digital video signal, such as a high-definition television (HDTV) signal, of a digital protocol may range from approximately 5 MHz to 42 MHz.

Another example protocol is Security Link Over Coaxial Cable (SLOG), which includes both lower-frequency analog and higher-frequency digital signals. Although a digital video signal may be better for recording on a DVR or other type of video recorder (for example since a digital video signal may allow for higher-resolution image communications and compression for reduced storage space), a digital video signal may include a significant latency between the time that an action is captured by the camera 110 and the time when the action is displayed on the monitor station 108. Such latency may be caused by the schemes used to code and decode the digital video signal. Even though this latency may be on the order of only a few seconds, the duration of the latency can mean the difference between a successful response and an unsuccessful response to an action that is captured by the camera 110. Therefore, the SLOC protocol also includes an analog video signal, which typically has a much smaller latency (e.g., a fraction of a second). Therefore, with the SLOC protocol, the digital signal can be used for recording the video, and the analog signal can be used for live viewing on the monitor station 108.

Examples of SLOC-related technology are described in U.S. patent application Ser. No. 12/363,669 (U.S. Patent Application Publication No. 2010/0194899), entitled "MIXED FORMAT MEDIA TRANSMISSION SYSTEMS AND METHODS," filed Jan. 30, 2009; U.S. patent application Ser. No. 12/698,061 (U.S. Patent Application Publication No. 2010/0321580), entitled "ANALOG EQUALIZER SYSTEMS AND METHODS FOR BASEBAND VIDEO SIGNALS," filed Feb. 1, 2010; U.S. patent application Ser. No. 12/698,066 (U.S. Patent Application Publication No. 2010/0322348), entitled "CONSTELLATION DETECTION IN A MULTI-MODE QAM COMMUNICATIONS SYSTEM," filed Feb. 1, 2010; U.S. patent application Ser. No. 12/698,071 (U.S. Patent Application Publication No. 2010/0322297), entitled "CARRIER PHASE OFFSET CORRECTION FOR A QAM SYSTEM," filed Feb. 1, 2010; U.S. patent application Ser. No. 12/698,037 (U.S. Patent Application Publication No. 2010/0322347), entitled "NOVEL FRAME STRUCTURE FOR A QAM SYSTEM," filed Feb. 1, 2010; U.S. patent application Ser. No. 12/698,041 (U.S. Patent Application Publication No. 2010/0322296), entitled "SLOC SPOT MONITORING," filed Feb. 1, 2010; Patent Cooperation Treaty Application No. PCT/US2010/022772, entitled "MIXED FORMAT MEDIA TRANSMISSIONS SYSTEMS AND METHODS," filed Feb. 1, 2010; Taiwan Patent Application No. 99102857, entitled "A METHOD AND APPARATUS FOR TRANSMITTING HIGH-DEFINITION MULTIMEDIA OVER COAXIAL CABLE," filed Feb. 1, 2010; and U.S. patent application Ser. No. 13/229,596 (U.S. Patent Application Publication No. 2012/0086813), entitled "SYSTEMS AND METHODS FOR DETECTING TAMPERING WITH VIDEO TRANSMISSION SYSTEMS," filed Sep. 9, 2011. These patent applications are incorporated herein by reference in their entireties.

With respect to the particular signal protocol that is used and providing the power signal over a coaxial cable, an issue that is sometimes encountered is that a power supply for a camera may cause significant interference on the coaxial cable. Often times, the on-board power supply of a camera may be poorly regulated and/or poorly filtered, and this poor regulation/filtering allows step increases or step decreases in the load current drawn by the camera's circuitry, thereby causing voltage transients to occur on the coaxial cable. Typically, the amplitudes of the SLOC signals are in a range of approximately ±500 millivolts (mv), and it has been observed that these transients may have amplitudes on the order of ±100 mv or higher. Consequently, because these voltage transients may have amplitudes on the order of the amplitudes of the SLOC signals, such transients may cause errors, such as a noticeable flicker on the monitor, noticeable artifacts in the digitally recorded image communications, image communication distortion, and temporary loss of synchronization between the camera, monitor, and DVR.

Given the above factors, one technique for providing power to a camera over a coaxial cable is to put physical filter inductors at each end of the coaxial cable. At a frequency of approximately zero, which is the frequency of a DC supply signal, each inductor would provide a signal path having a low resistance (e.g., a resistance of approximately zero). In contrast, at the video frequencies that can have frequencies as low as approximately 30 Hz, each inductor would present an impedance that is significantly higher than the characteristic impedance $Z_0$ of the coaxial cable, such that the inductor would not significantly alter the termination impedance that is coupled to the respective end of the coaxial cable.

A problem with this technique, however, is that to have the frequency response described above (e.g., low impedance at approximately 0 Hz and high impedance at approximately 30 Hz), each inductor would need to be approximately a few Henries (H). Furthermore, considering that a camera may need to draw a supply current of a few hundred milliamps or more over a coaxial cable, building a physical inductor of a few Henries that can carry such a high DC current would be difficult and expensive, and the inductor would be relatively large. One reason is that the relatively high supply current would saturate the inductor's core, and this saturation would cause the inductor to appear as a low impedance capacitive-type load at the higher video signal frequencies (e.g., approximately 40 MHz). That is, at these higher frequencies, where the inductor should behave like a very large impedance, the inductor would instead behave like the opposite (e.g., a small impedance on the order of the characteristic impedance $Z_0$).

When such an impedance of the inductor is in parallel with the termination impedance of a monitor or camera (typically this termination impedance may be located inside the monitor/camera, thereby making the termination impedance difficult to alter), the impedance of the inductor may significantly lower the equivalent termination impedance, such that the equivalent termination impedance is no longer approximately equal to the characteristic impedance $Z_0$. Therefore to address these drawbacks, first and second active inductors 112 and 114 are used instead of large physical inductors in the embodiment of FIG. 1. The active inductors 112 and 114 provide a practical small physical size, while also being of a few Henries in inductance for the appropriate frequency response at high and low frequencies.

Figure 2:
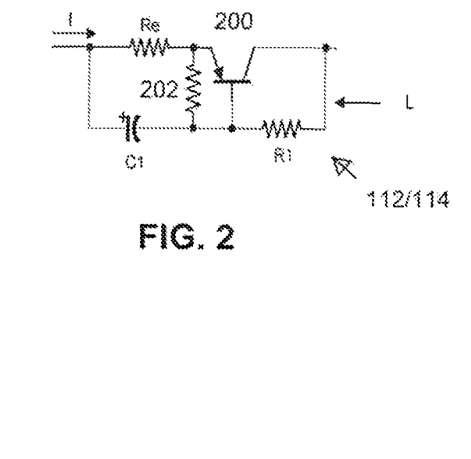
FIGS. 2-3 are circuit schematic diagrams of example active inductors for the image communication system of FIG. 1 according to various embodiments.
Figure 3:
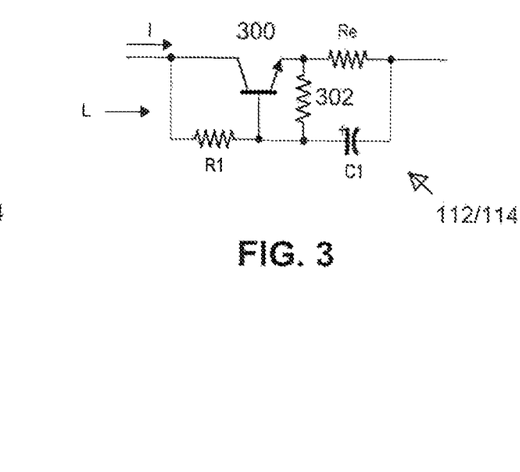

FIGS. 2-3 are circuit schematic diagrams of example active inductors that may be used for the first active inductor 112 and/or the second active inductor 114 according to various embodiments. The embodiments of the active inductors of FIGS. 2-3 use an active device (e.g., a transistor) in a gyrator circuit configuration (e.g., an impedance inverter). For example, the embodiment of the active inductor of FIG. 2 includes a PNP transistor 200 that is coupled to resistors Re and R1 and capacitor C1. The embodiment of the active inductor of FIG. 3 includes a NPN transistor 300 that is coupled to resistors Re and R1 and capacitor C1. The equivalent inductance L can be generally approximated according to $L \sim = Re*C1*R1$. In some embodiments, a resistor 202 and a resistor 302 may be respectively coupled to the transistors 200 and 300, so as to provide positive feedback that enables a "bootstrap" approach for the gyrator circuit configuration. The resistors 202 and 302 may have a value, for example, of 10 k ohms.

The first active inductor 112 is located at the monitor side 102 and is coupled between an input power supply 116 and a first end of the coaxial cable 106. The second active inductor 114 is located at the camera side 104, and is coupled between a second end of the coaxial cable 106 and an output power supply for the camera 110. In one embodiment, the output power supply may be in the form of a switch mode power supply 118 that is configured to down convert the power signal from the input power supply 116 to a lower voltage. For example, if the power supply signal is at 48 V, the switch mode power supply 118 can down convert the power supply signal to a lower voltage such as 12 V. A filter 120 may be coupled between the second active inductor 114 and the camera 110, and the operation of the filter 120 will be described in further detail later below.

With respect to the first active inductor 112 and the second active inductor 114, an active inductor having an inductance of a few Henries may be used. Such an active inductor may have a resistance, for example, on the order of approximately 25 ohms. Therefore, if the supply current is approximately 200 milliamps (mA), then there would be approximately a 5 Volt DC (VDC) drop across each of the active inductors 112 and 114 in addition to the voltage drop across the coaxial cable 106. However, for an image communication system where the input supply voltage (from the monitor side 102, e.g., 48 VDC) is significantly higher than the output supply voltage (the voltage generated by the switch mode power supply 118, e.g., 12 VDC), these magnitudes of voltage drops can typically be tolerated.

However, the step changes in the load current drawn by the camera 110 may be on the order of ±10 mA, and therefore, may cause voltage spikes/transients of approximately 250 mV across each of the active inductors 112 and 114 (assuming each active inductor has a impedance of at least approximately 25 ohms) and may also cause voltage spikes on the same order of magnitude across the coaxial cable 106. Consequently, at the inputs to the monitor station 108, these voltage spikes may have magnitudes on the order of approximately ±100 mV or higher, and thus may cause problems such as monitor flicker, artifacts in the digitally recorded video image communications, image communication distortion, and temporary loss of synchronization between the camera 110 and the monitor station 108 (including a DVR).

Figure 4:
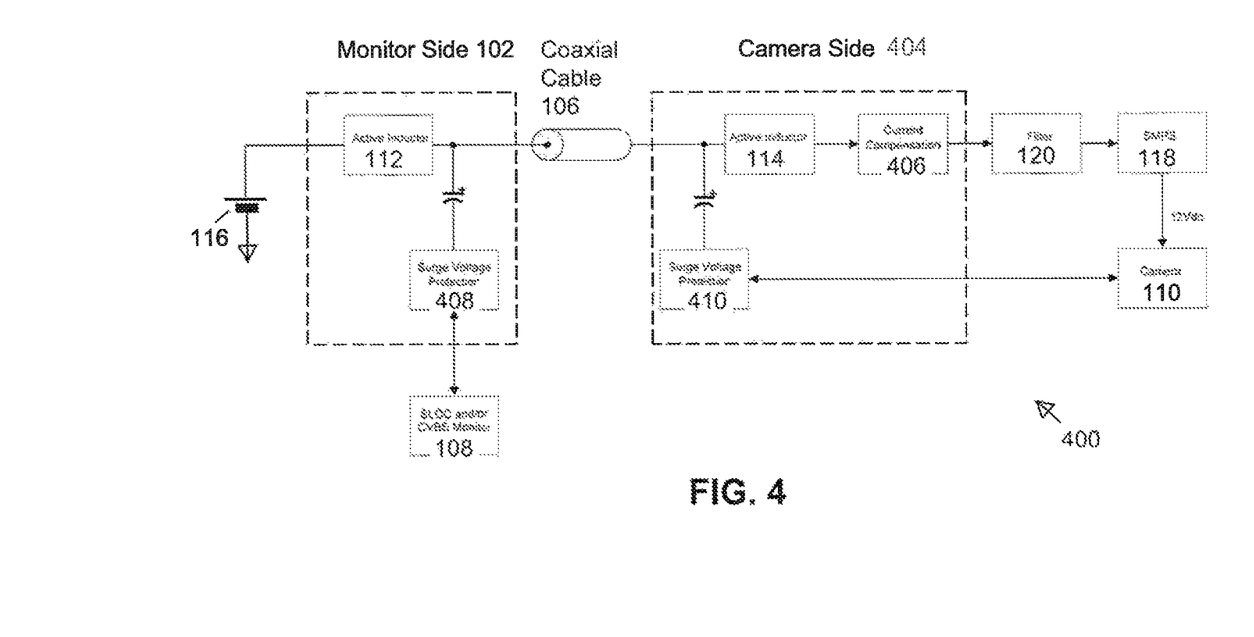
FIG. 4 is a block diagram of another image communication system according to one embodiment.

FIG. 4 is a block diagram of an embodiment of another image communication system 400, which provides a solution to the voltage-transient problem described above. In a camera side 404 of the image communication system 400, a current-compensation circuit 406 is coupled between the second active inductor 114 and the camera 110 to filter out the voltage transients. Operation of one or more embodiments of the current-compensation circuit 406 can be understood by referring next to FIGS. 5-6, which are circuit schematic diagrams showing the current-compensation circuit 406 in more detail.

The input to the current-compensation circuit 406 is a DC current $I_{inductor}$ that is output from the second active inductor 114 on the camera side 404. The current-compensation circuit 406 splits $I_{inductor}$ into two components: a load current $I_{load}$ that flows to the switch mode power supply 118 (shown as "current load" in FIG. 5) for the camera 110, and a compensation current $I_{comp}$ that flows along a compensation path. The compensation circuit 406 operates to offset any change in $I_{load}$ with an equal and opposite change in the compensation current $I_{comp}$, such that the net magnitude change to the current $I_{inductor}$ of the second active inductor 114 is zero.

Figure 5:
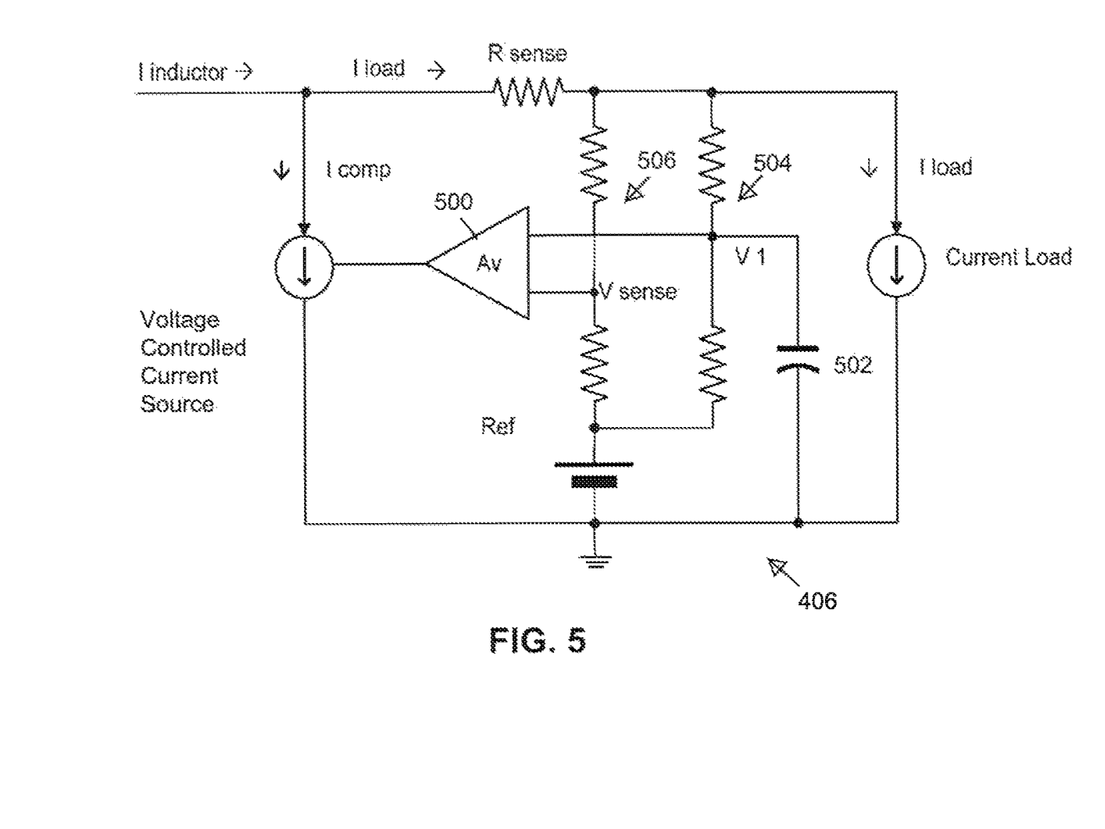
FIG. 5 is a circuit schematic diagram of a current-compensation circuit for the image communication system of FIG. 4 according to one embodiment.

For example, if there is a step load increase of 10 mA in $I_{load}$ (the load suddenly draws 10 more mA than it had been drawing), then the compensation current $I_{comp}$ would have an equal yet opposite change of −10 mA so that the change in the current $I_{inductor}$ of the second active inductor 114 is zero. That is, 10 more mA flows down the load path but 10 fewer mA flows down the compensation path, and so these 10 mA currents effectively cancel each other out such that the magnitude of the current $I_{inductor}$ is approximately unchanged.

In more detail, an embodiment of the current-compensation circuit 406 includes a sense resistor $R_{sense}$ and an operational amplifier 500 having first input terminal coupled to a capacitor 502 and a first voltage divider 504. A second input terminal of the operation amplifier 500 is coupled to a second voltage divider 506. The change in the load current $I_{load}$ is sensed across the sense resistor $R_{sense}$, and the change in the voltage across $R_{sense}$ affects a voltage $V_{sense}$ at the second input terminal of the operational amplifier 500. A reference voltage $V_1$ is set up using the capacitor 502 and the first voltage divider 504 at the first input terminal of the operational amplifier 500.

In a steady state situation, when there is no load change and the load current $I_{load}$ is constant, the inputs to the operational amplifier 500 are offset such that the compensation current $I_{comp}$ is not equal zero. This condition effectively sets a non-zero bias point for the compensation current $I_{comp}$ so that the compensation current $I_{comp}$ has "room" to get bigger or get smaller without going to zero. In the embodiment illustrated in FIG. 6, because a single transistor 600 provides the compensation current $I_{comp}$, the compensation current $I_{comp}$ cannot go lower than zero. In another embodiment, a second transistor may be provided that would turn on when the load current $I_{load}$ decreases so that the compensation current $I_{comp}$ can be zero (and thus save quiescent power) in a steady state.

Figure 6:
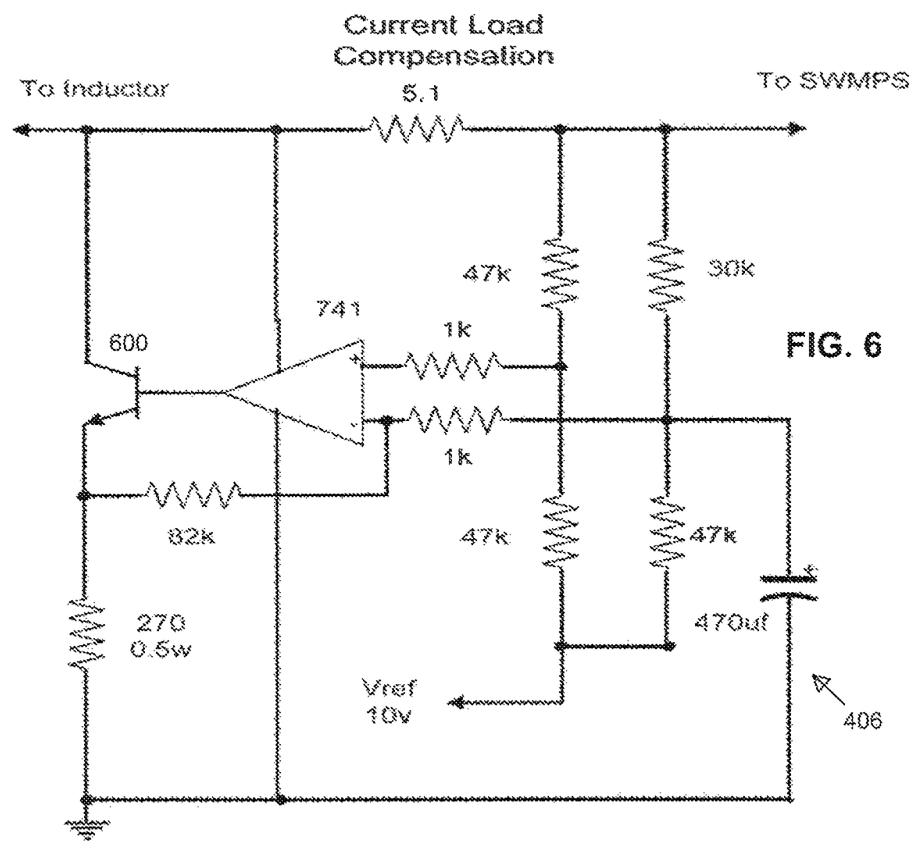
FIG. 6 is a circuit schematic diagram of a current-compensation circuit for the image communication system of FIG. 4 according to another embodiment.

Although FIGS. 5-6 illustrate embodiments of the current-compensation circuit 406, other embodiments are possible. For example, while specific resistance, voltage, and capacitor values are provided with respect to FIG. 6, other values may be used in other circuits. Moreover, other configurations of the current-compensation circuit 406 can be provided so as to compensate for or to otherwise neutralize the adverse effects of the voltage spikes.

Yet another potential problem is that if one uncouples the monitor station 108 from the coaxial cable 106, or uncouples the camera 110 from the coaxial cable 106, while the image communication system is still on (or before the image communication system has a chance to completely power down), then there can be induced (e.g., capacitively induced) voltage spikes/transients on the coaxial cable 106. These spikes may be sufficiently large to damage input circuitry and output circuitry of the camera 110 and the monitor station 108. Accordingly, to reduce these capacitively induced spikes to a level that will not damage the input circuitry and output circuitry of the camera 110 and the monitor station 108, one embodiment of the image communication system 400 of FIG. 4 includes a first surge protection circuit 408 and a second surge protection circuit 410. The first surge protection circuit 408 is included at the monitor side 402 and is coupled between the first end of the coaxial cable 106 and the monitor station 108. The second surge protection circuit 410 is included in the camera side 404 and is coupled between the second end of the coaxial cable 106 and the camera 110. The first and second surge protection circuits 408 and 410 of one embodiment may operate in a similar manner to electrostatic-discharge (ESD) protection circuits.

Figure 7:
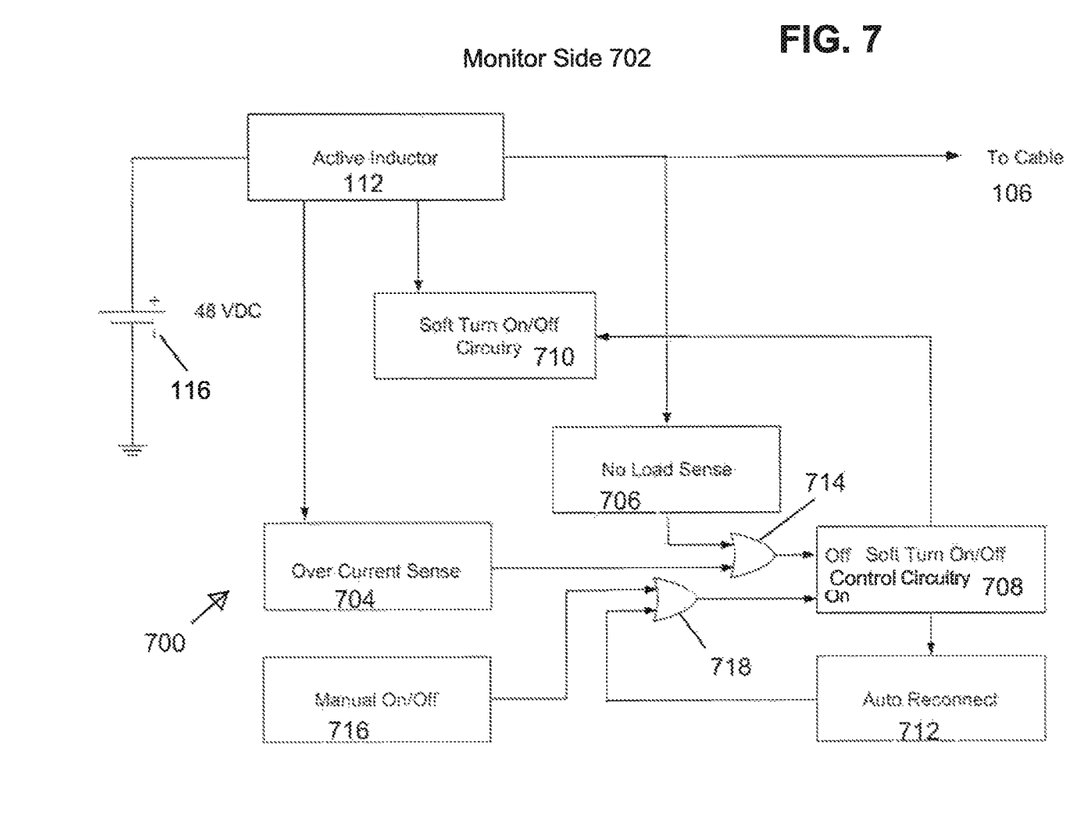
FIG. 7 is a block diagram showing components at a monitor side of an image communication system according to various embodiments.

FIG. 7 is a block diagram showing components of an image communication system 700 according to various embodiments, and in particular shows example components that may be included at a monitor side 702 of the image communication system 700. Similar components (such as the first active inductor 112, the coaxial cable 106, etc.) as the other embodiments of the previously described image communication systems are shown and labeled similarly in FIG. 7. For the sake of simplicity of illustration, some other components (such as the first surge protection circuit 408, the monitor station 108, etc.) that may or may not be included in one embodiment of the image communication system 700 are not shown in FIG. 7.

According to one embodiment of the image communication system 700, the monitor side 702 includes an over current sense circuitry 704 coupled to the first active inductor 112, a no load sense circuitry 706 coupled to the coaxial cable 106, soft turn on/off control circuitry 708 having a first input terminal coupled to output terminals of the over current sense circuitry 704 and the no load sense circuitry 706, soft turn on/off circuitry 710 having an input terminal coupled to a first output terminal of the soft turn on/off control circuitry 708, and automatic reconnect circuitry 712 having an input terminal coupled to a second output terminal of the soft turn on/off control circuitry 708 and having an output terminal coupled to a second input terminal of the soft turn on/off control circuitry 708.

In one embodiment, a logic gate 714 (such as an OR gate) can be used to couple the output terminals of the over current sense circuitry 704 and the no load sense circuitry 706 to the first input terminal of the soft turn on/off control circuitry 708. Moreover in one embodiment, manual on/off circuitry 716 can be provided to enable a user to manually control activation/deactivation of the first active inductor 112. An output terminal of the manual on/off circuitry 716 and the output terminal of the automatic reconnect circuitry 712 can be coupled to the second input terminal of the soft turn on/off control circuitry 708 by way of a logic gate 718 (such as an OR gate).

Figure 8:
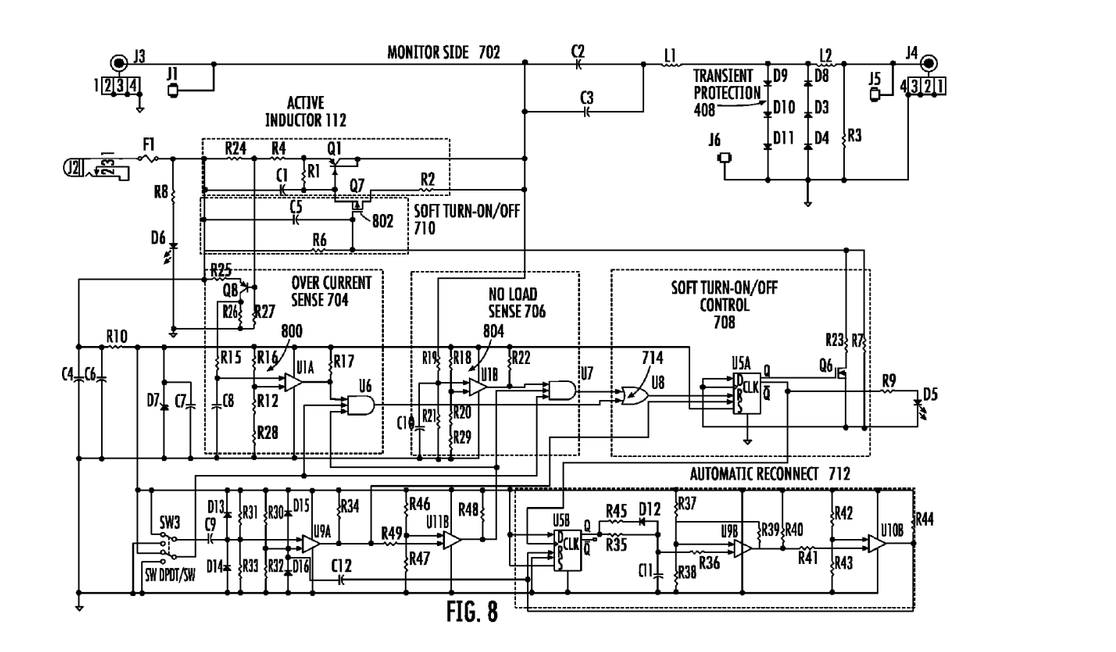
FIG. 8 is a circuit schematic diagram showing the components at the monitor side of the image communication system of FIG. 7 in more detail, according to various embodiments.

FIG. 8 is a circuit schematic diagram showing the components at the monitor side 702 of the image communication system 700 of FIG. 7 in more detail, according to various embodiments. With reference to both FIGS. 7-8, operation of these various components will now be described:

With respect to over current control, the over current sense circuitry 704 is configured to sense the load current in the first active inductor 112 by measuring or otherwise determining a voltage across a resistor R24. This measured voltage is compared (using a comparator U1A coupled to voltage divider circuitry 800) to a reference voltage. If the measured voltage is "too high" (e.g., too large of a current), then the comparator U1A becomes active and sends a shut down signal to the soft turn on/off control circuitry 708. The soft turn on/off control circuitry 708 in turn shuts the first active inductor 112 off by sending a signal to the soft turn on/off circuitry 710, such as by turning off (open circuiting) a transistor 802 in the soft turn on/off circuitry 710. Turning off the first active inductor 112 therefore prevents a short circuit from damaging the monitor station 108 (including a DVR and/or other components at the monitor side 702).

With respect to no load control, the no load sense circuitry 706 of one embodiment may be somewhat similar to the over current sense circuitry 704 (for example, including a comparator U1B coupled to voltage divider circuitry 804 to compare a measured/determined voltage with a reference voltage), except that the no load sense circuitry 706 is configured to sense if the coaxial cable 106 has been disconnected. If the coaxial cable 106 is sensed to be disconnected, then the no load sense circuitry 706 sends a shut down signal to the soft turn on/off control circuitry 708. The soft turn on/off control circuitry 708 in turn shuts the first active inductor 112 off by sending a signal to the soft turn on/off circuitry 710, such as by turning off (open circuiting) the transistor 802 in the soft turn on/off circuitry 710. One purpose of the no load sense circuitry 706 may be, for example, to address a situation wherein if a disconnected coaxial cable 106 is not sensed and then if the coaxial cable 106 is reconnected, a current surge may go through the coaxial cable 106, thereby possibly creating harmful voltage spikes.

With respect to the soft turn on/off control circuitry 708, this circuitry senses the aforementioned shut down signals from the over current sense circuitry 704 and the no load sense circuitry 706. One embodiment of the soft turn on/off control circuitry 708 includes a D flip-flop U5A that is configured to set its Q output in response to receiving the shut down signals. The D flip-flop U5A is coupled to a transistor Q6, which turns off in response to the Q output being set. The D flip-flop U5A also has a Q_N output that enables the automatic reconnect circuitry 712.

With respect to the automatic reconnect circuitry 712, one embodiment includes a D flip-flop U5B and a capacitor C11. In response to the Q_N output from the D flip-flop U5A, the D flip-flop U5B generates a Q output that causes the capacitor C11 to charge. The voltage of the capacitor C11 is sensed by a Schmitt trigger U9B having a first reference voltage. If the initial reference voltage is reached, the Schmitt trigger U9B activates, thereby discharging the capacitor C11. When the discharging voltage signal reaches a second reference voltage, the Schmitt trigger U9B shuts the discharging voltage signal off. The result is a short pulse (for instance around 4 seconds in duration, at a 10 second rate), and this pulse is then sent to the soft turn on/off control circuitry 708 to start the reconnect process.

The automatic reconnect circuitry 712 is useful for several reasons. For instance, if the coaxial cable 106 is disconnected, the automatic reconnect circuitry 712 will enable power output to the coaxial cable 106 within a certain timeframe (for instance 10 seconds in this example). If the coaxial cable 106 is still disconnected, the no load sense circuitry 706 will sense this condition and shut down the power to the coaxial cable 106, and wait another 10 seconds (for example) to try again. If the coaxial cable 106 is reconnected, then the automatic reconnect circuitry 712 will allow connection.

The same or similar method may be used in conjunction with the over current sense circuitry 704. For instance, if a current overload is detected, the power to the coaxial cable 106 is shut down by the over current sense circuitry 704 for 10 seconds (for example), and then the automatic reconnect circuitry 712 will try to reconnect thereafter.

Figure 9:
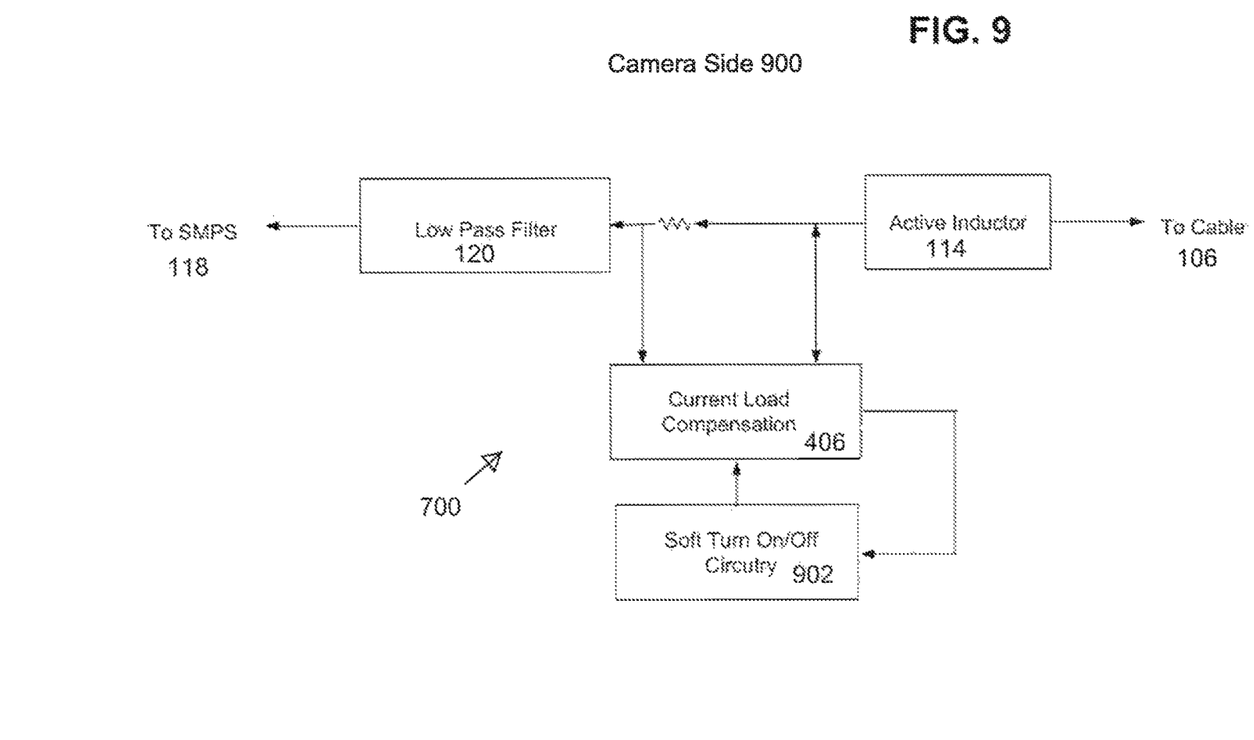
FIG. 9 is a block diagram showing components at a camera side of the image communication system of FIG. 7 according to various embodiments.

FIG. 9 is a block diagram showing components at a camera side 900 of the image communication system 700 of FIG. 7 according to various embodiments. The camera side 900 includes soft turn on/off circuitry 902 having an input terminal coupled to an output terminal of the current-compensation circuit 406 and having an output terminal coupled to an input terminal of the current-compensation circuit 406. As with the block diagram of FIG. 7, some components in FIG. 9 are similarly numbered as in other drawings and some other components have not been explicitly illustrated in FIG. 9, for purposes of simplicity.

Figure 10:
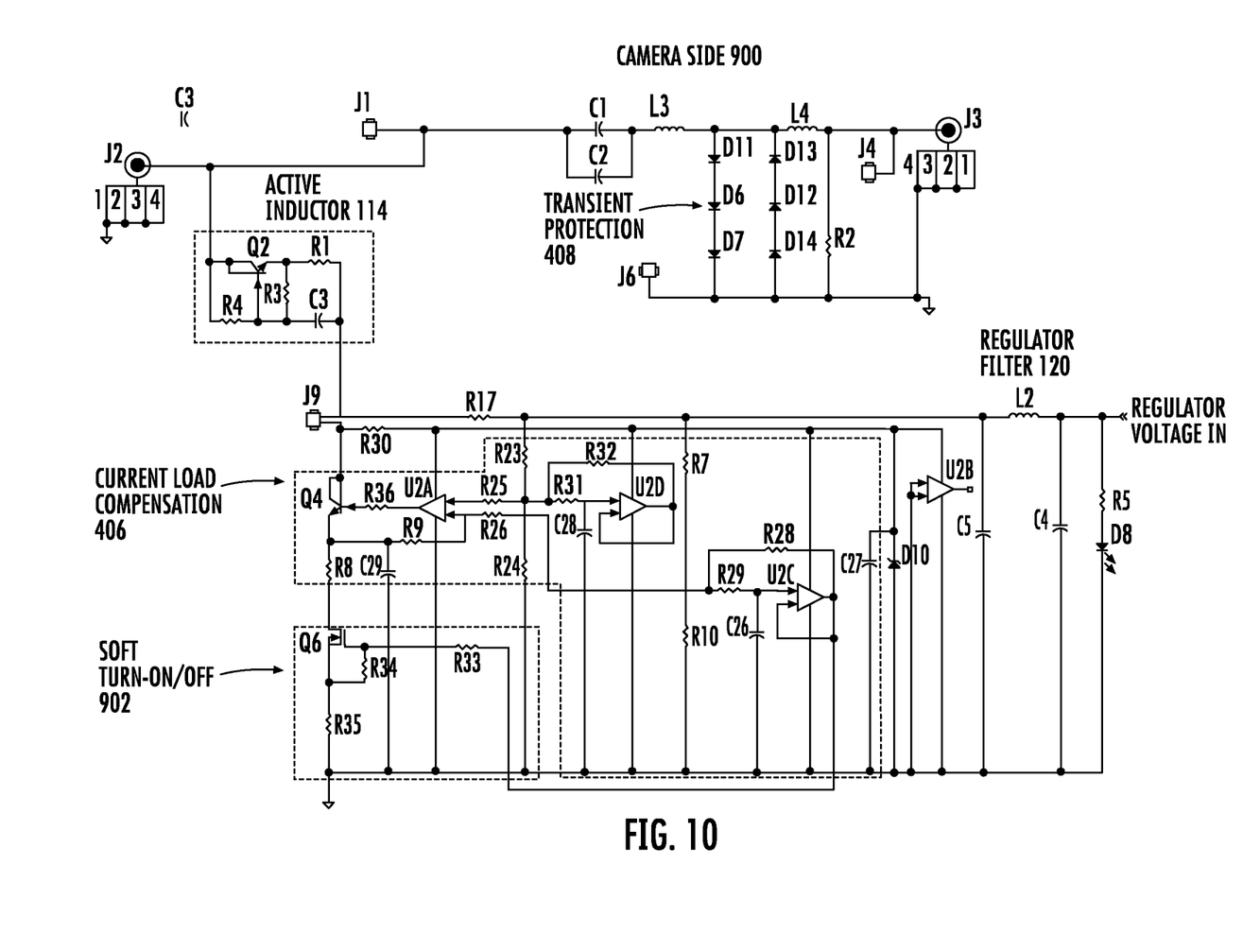
FIG. 10 is a circuit schematic diagram showing the components at the camera side of the image communication system of FIG. 7 in more detail, according to various embodiments.

FIG. 10 is a circuit schematic diagram showing the components at the camera side 900 of the image communication system 700 of FIG. 7 in more detail, according to various embodiments. With reference to both FIGS. 9-10, operation of one embodiment of the soft turn on/off circuitry 902 is described as follows. The soft turn on/off circuitry 902 of one embodiment includes a N-channel metal oxide semiconductor field effect transistor (MOSFET) Q6 or other type of transistor(s) used a switch. When power is first applied to the camera side 900, the output voltage of U2A will go to the voltage at the output of the active inductor 114. This happens because a voltage of a capacitor C26 is lower than the voltage at a resistor R25. This high output voltage will appear at the junction of a transistor Q4 and the resistor R8. This voltage can reach approximately 40 VDC, for example in one embodiment. If a resistor R35 of the soft turn on/off circuitry 902 is at ground, then the current in this resistor R35 will be approximately 40/560=0.070 A, for example in one embodiment. The power in the resistor R35 is $I^2R$=approximately 2.7 W.

In order to reduce this turn on power, the N-Channel MOSFET Q6 is used as a switch. On turn on, the voltage from the capacitor C26 is low. This low voltage is applied to the gate of the MOSFET Q6 through the resistor divider made up of resistors R33 and R34. A low voltage turns the MOSFET Q6 off making it a high impedance (approximately 100K ohms for example). This impedance is in series with the resistor R8 and thus the current in the resistor R8 is low. As the capacitor C26 charges, the voltage at the gate of the MOSFET 26 gets larger, gradually turning on the MOSFET 26 until it is totally on. The circuit at the camera side 900 now will operate at its nominal power Now referring to both of the circuit schematics of FIGS. 8 and 10, further details of operation of an embodiment of the image communication system 700 is described herein. A supply current flows from the input power supply 116 (shown in FIG. 7 as a 48 VDC power supply) on the monitor side 702 of the coaxial cable 106, through the first active inductor 112, through the coaxial cable 106, through the second active inductor 114, through the filter 120 and the current-compensation circuit 406 (or vice versa), and to the switch mode power supply 118 of the camera 110.

In one embodiment, the DC resistances of the active inductors 112 and 114 could ideally be zero such that there is no voltage drop across the active inductors 112 and 114. Furthermore, capacitors C2 and C3 coupled between the coaxial cable 106 and the monitor station 108 on the monitor side 702, and capacitors C1 and C2 coupled between the coaxial cable 106 and the camera 110 on the camera side of the coaxial cable 106, block the DC power signal from entering into those nodes. Assuming, for example purposes, that the coaxial cable 106 is an RG59 cable having a characteristic impedance $Z_0$ of approximately 75 ohms, then both the input to the monitor station 108 and the input to the camera 110 have approximately 75 ohm terminations (not shown) built into them. However, the active inductors 112 and 114 and the diodes of the surge protection circuits 408 and 410 have parasitic capacitances associated with them. If these parasitic capacitances are not compensated for, then for at least at some frequencies such as the higher video frequencies of approximately 30-40 MHz, the equivalent termination impedance is altered to a value other than 75 ohms. As discussed above, having an equivalent termination impedance that is of a different value from the characteristic impedance $Z_0$ results in non-optimal (e.g., less than maximum) power transfer between the camera 110 and the monitor station 108.

For example, an image communication system may be designed to withstand a total signal loss of 15 db. However, if the coaxial cable 106 is at its maximum length (such as 1000 feet), then most or all of this 15B loss may occur over the coaxial cable 106. Therefore, any significant additional losses, such as due to the equivalent termination impedance differing from $Z_0$, may increase the signal loss to a point where the image communication system may not function properly. Consequently, in an embodiment of the image communication system 700, inductors L1 and L2 are included at the monitor side 702 of the coaxial cable 106, and inductors L3 and L4 are included at the camera side 900 of the coaxial cable 106, so as to compensate for the parasitic capacitances of the active inductors 112 and 114 and the diodes. This configuration enables the equivalent termination impedances at close to $Z_0$=75 ohms over the entire bandwidth occupied by the video signals that propagate along the coaxial cable 106.

The filter 120, which may be coupled between the active inductor 114 on the camera side 900 and the current-load compensation circuit 406, keeps the switching noise from the switch mode power supply 118 from feeding back onto the coaxial cable 106 and back to the monitor station 108. Therefore in one embodiment, this filter 120 may be designed to have a filtering band that corresponds to the switching frequency of the switch mode power supply 118 and some of its harmonics. In other embodiments, this filter 120 may be placed on the other side of the current-compensation circuit 406 between the current-compensation circuit 406 and the switch mode power supply 118.

In the embodiment of the current-load compensation circuit 406 of FIG. 10, a resistor R8 may be used to set the maximum compensation current $I_{comp}$, where in this embodiment, the minimum compensation current would be zero. If some or all of the various circuitry shown in the drawings were put on an integrated circuit, then perhaps this resistor R8 could be an external resistor that a user can provide based on the expected magnitude of the load transients that the camera 110 is expected to generate. For example, small cameras may generate load-current transients on the order of approximately 30-40 mA, and larger cameras may generate load-current transients in the hundreds of milliamps. In some embodiments, the topology of the current-load compensation circuit 406 may be altered to eliminate one or more of the capacitors contained therein.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the embodiments to the precise forms disclosed. While specific embodiments are described herein for illustrative purposes, various equivalent modifications are possible. For instance, while some drawings and/or the accompanying description include specific resistance, capacitance, inductance, voltage, or current values, such values are merely illustrative and not intended to be limiting. Other values may be used in other embodiments, based on factors such as the particular circuit configuration being used, the specific operational performance being sought, real estate usage/availability on an integrated circuit or other implementation environment, and so forth.

Furthermore, where an alternative is disclosed for a particular embodiment, this alternative may also apply to other embodiments even if not specifically stated. These and other modifications can be made in light of the above detailed description.

What is claimed is:

1. A system, comprising:
 a first active inductor coupled between an input power supply and a first end of a cable that is configured to carry a communication signal;
 a current-compensation circuit coupled an output power supply; and
 a second active inductor coupled between a second end of the cable and the compensation circuit;
 wherein the first and second active inductors are configured to enable power to pass through the cable from the input power supply to the output power supply, and
 wherein the current-compensation circuit is configured to reduce voltage spikes across the active inductors.

2. The system of claim 1 wherein the cable includes a coaxial cable.

3. The system of claim 1, further comprising a camera coupled to the output power supply.

4. The system of claim 1, further comprising a monitor station coupled to the first end of the cable.

5. The system of claim 4 wherein the monitor station includes a recording device.

6. The system of claim 1 wherein the output power supply includes a switch-mode power supply configured to down convert a voltage from the input power supply to a lower voltage.

7. The system of claim 1, further comprising:
 over-current sense circuitry coupled to the first active inductor, and configured to sense an over current in the first active inductor and configured to generate a signal in response to the sensed over current; and
 control circuitry coupled to the over-current sense circuitry to receive the generated signal, and configured to deactivate the first active inductor in response to the received generated signal.

8. The system of claim 1, further comprising:
 no-load sense circuitry coupled to the cable, and configured to sense disconnection of the cable and configured to generate a signal in response to the sensed disconnection; and
 control circuitry coupled to the no-load sense circuitry to receive the generated signal, and configured to deactivate the first active inductor in response to the received generated signal.

9. The system of claim 8, further comprising automatic reconnection circuitry coupled to the cable and configured to automatically attempt connection of power to the cable after disconnection of the cable is sensed.

10. The system of claim 1, further comprising surge-protection circuitry coupled to either or both the first and second ends of the cable, and configured to reduce voltage spikes on the cable.

11. An apparatus, comprising:
 a gyrator circuit configured as an active inductor to enable power to be passed along a coaxial cable, the gyrator circuit including:
 an active device; and
 first and second resistors and a capacitor coupled to the active device,
 wherein an inductance provided by the gyrator circuit is approximated according to values of the first and second resistors and the capacitor, and
 wherein the inductance enables the active inductor to have low impedance at a direct-current frequency and high impedance at a higher frequency corresponding to a frequency of a video signal carried on the coaxial cable.

12. The apparatus of claim 11 wherein the inductance is approximated according to a relationship $L \sim = Re*C1*R1$, wherein Re, R1, and C1 are the values, respectively, of the first resistor, the second resistor, and the capacitor.

13. The apparatus of claim 11 wherein the gyrator circuit further includes a third resistor coupled to the active device to provide positive feedback to enable bootstrapping.

14. An apparatus, comprising:
 a current-compensation circuit coupleable to a coaxial cable that carries both a power signal and a video signal, wherein the current-compensation circuit is configurable to reduce voltage spikes in the coaxial cable and in at least one active inductor coupled to the coaxial cable.

15. The apparatus of claim 14 wherein to reduce voltage spikes, the current-compensation circuit is configured to:
 split an inductor current of the active inductor into a load current and a compensation current; and
 in response to a change in the load current, offset the change in the load current with an equal and opposite change in the compensation current, such that a net change in the inductor current is approximately zero.

16. The apparatus of claim 15 wherein the current-compensation circuit includes:
 a sense resistor;
 a capacitor;
 first and second voltage dividers; and
 an operational amplifier having first input terminal coupled to the capacitor and to the first voltage divider, and having a second input terminal coupled to the second voltage divider,
 wherein the change in the load current is sensed across the sense resistor, and a change in a voltage across the sense resistor affects a voltage at the second input terminal of the operational amplifier,
 wherein a reference voltage is set using the capacitor and the first voltage divider at the first input terminal of the operational amplifier, and
 wherein the operational amplifier is configured to control the compensation current according to the change in the load current at the first input terminal.

17. A method, comprising:
 using first and second active inductors to pass power from a power supply coupled to a first end of a coaxial cable to a camera coupled to a second end of the coaxial cable, wherein the power is passed along the coaxial cable; and
 compensating for a change in a load current drawn by the camera.

18. The method of claim 17 wherein said compensating further includes:
- splitting an inductor current of the second active inductor into the load current and a compensation current; and
- in response to the change in the load current, offset the change in the load current with an equal and opposite change in the compensation current, such that a net change in the inductor current is approximately zero.

19. The method of claim 17, further comprising using a surge-protection circuit to protect the camera from voltage transients in response to connection or disconnection of the coaxial cable while power is being provided on the coaxial cable.

20. The method of claim 17, further comprising:
- sensing an over current in the first active conductor and generating a signal in response to the sensed over current; and
- deactivating the first active inductor in response to the generated signal.

21. The method of claim 17, further comprising:
- sensing disconnection of the cable and generating a signal in response to the sensed disconnection; and
- deactivating the first active inductor in response to the generated signal.

22. The method of claim 21, further comprising automatically attempting reconnection of power to the cable after disconnection of the cable is sensed.

23. The method of claim 17, further comprising filtering a voltage spike caused in at least one of the active inductors and the coaxial cable by the change in the load current so as to reduce an effect of the voltage spike on a video signal transmitted by the camera on the coaxial cable.

* * * * *